(12) United States Patent
Yegin et al.

(10) Patent No.: US 9,317,688 B2
(45) Date of Patent: Apr. 19, 2016

(54) METHOD AND APPARATUS FOR PROVIDING MACHINE-TO-MACHINE SERVICE

(75) Inventors: Alper Yegin, Sariyer (TR); Youngkyo Baek, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 260 days.

(21) Appl. No.: 13/447,599

(22) Filed: Apr. 16, 2012

(65) Prior Publication Data

US 2012/0266223 A1    Oct. 18, 2012

Related U.S. Application Data

(60) Provisional application No. 61/475,972, filed on Apr. 15, 2011, provisional application No. 61/485,275, filed on May 12, 2011, provisional application No. 61/544,577, filed on Oct. 7, 2011.

(51) Int. Cl.

| | |
|---|---|
| G06F 21/57 | (2013.01) |
| H04L 29/06 | (2006.01) |
| H04W 4/00 | (2009.01) |
| H04W 12/06 | (2009.01) |
| G06F 9/44 | (2006.01) |

(52) U.S. Cl.
CPC ............ *G06F 21/57* (2013.01); *H04L 63/0807* (2013.01); *H04W 4/001* (2013.01); *H04W 4/005* (2013.01); *H04W 12/06* (2013.01); *G06F 9/4401* (2013.01); *G06F 2221/2143* (2013.01); *H04L 63/126* (2013.01); *H04L 2463/061* (2013.01)

(58) Field of Classification Search
CPC .................................................... H04W 4/005
USPC ............................................................ 726/7
See application file for complete search history.

(56) References Cited

U.S. PATENT DOCUMENTS

| | | |
|---|---|---|
| 2005/0138355 A1 | 6/2005 | Chen et al. |
| 2008/0195861 A1 | 8/2008 | Salomone |
| 2009/0019284 A1 | 1/2009 | Cho et al. |
| 2011/0016321 A1 | 1/2011 | Sundaram et al. |
| 2011/0271110 A1* | 11/2011 | Ohba et al. ..................... 713/168 |
| 2012/0047551 A1* | 2/2012 | Pattar et al. ....................... 726/1 |

(Continued)

FOREIGN PATENT DOCUMENTS

CN    101542973 A    9/2009

OTHER PUBLICATIONS

Cakulev et al, An EAP Authentication Method Based on Identity-Based Authenticated Key Exchange, Mar. 7, 2011, http://tools.ietf.org/pdf/draft-cakulev-emu-eap-ibake-00.pdf.*

(Continued)

*Primary Examiner* — Amir Mehrmanesh
*Assistant Examiner* — Khang Do
(74) *Attorney, Agent, or Firm* — Jefferson IP Law, LLP

(57) ABSTRACT

A method and an apparatus for providing service are provided. A method of providing service by a Machine-to-Machine (M2M) device includes transmitting a request for a first authentication to a Network Security Capability (NSEC), the request for the first authentication including an identifier of the M2M device, performing an Extensible Authentication Protocol (EAP) authentication with the NSEC, and generating, if the first authentication is successful, a secret key using at least one of a Master Session Key (MSK) and the identifier of the M2M device.

16 Claims, 12 Drawing Sheets

(56) References Cited

U.S. PATENT DOCUMENTS

2012/0047558 A1* 2/2012 Sundaram et al. .............. 726/3
2012/0198520 A1* 8/2012 Cha et al. .............. 726/3
2014/0056193 A1* 2/2014 Huang et al. .............. 370/311

OTHER PUBLICATIONS

ETSI, Machine- to- Machine communications (M2M); Functional architecture, Apr. 12, 2011, DTS 102 690 v0.11.1.*

Cakulev et al., An EAP Authentication Method Based on Identity-Based Authenticated Key Exchange, Mar. 7, 2011, http://tools.ietf.org/pdf/draft-cakulev-emu-eap-ibake-00.pdf.*
"Machine-to-Machine communications (M2M); M2M service requirements," ETSI TS 102 689 V1.1.1 (Aug. 2010) See section 7.1 and 7.2.
Y. Ohba et al, "Definition of Master Key between PANA Client and Enforcement Point," RFC 5807, Mar. 10, 2010.
"Machine-to-Machine communications (M2M); Functional architecture," DTS 102 690 V0.11.1, Apr. 12, 2011.

* cited by examiner

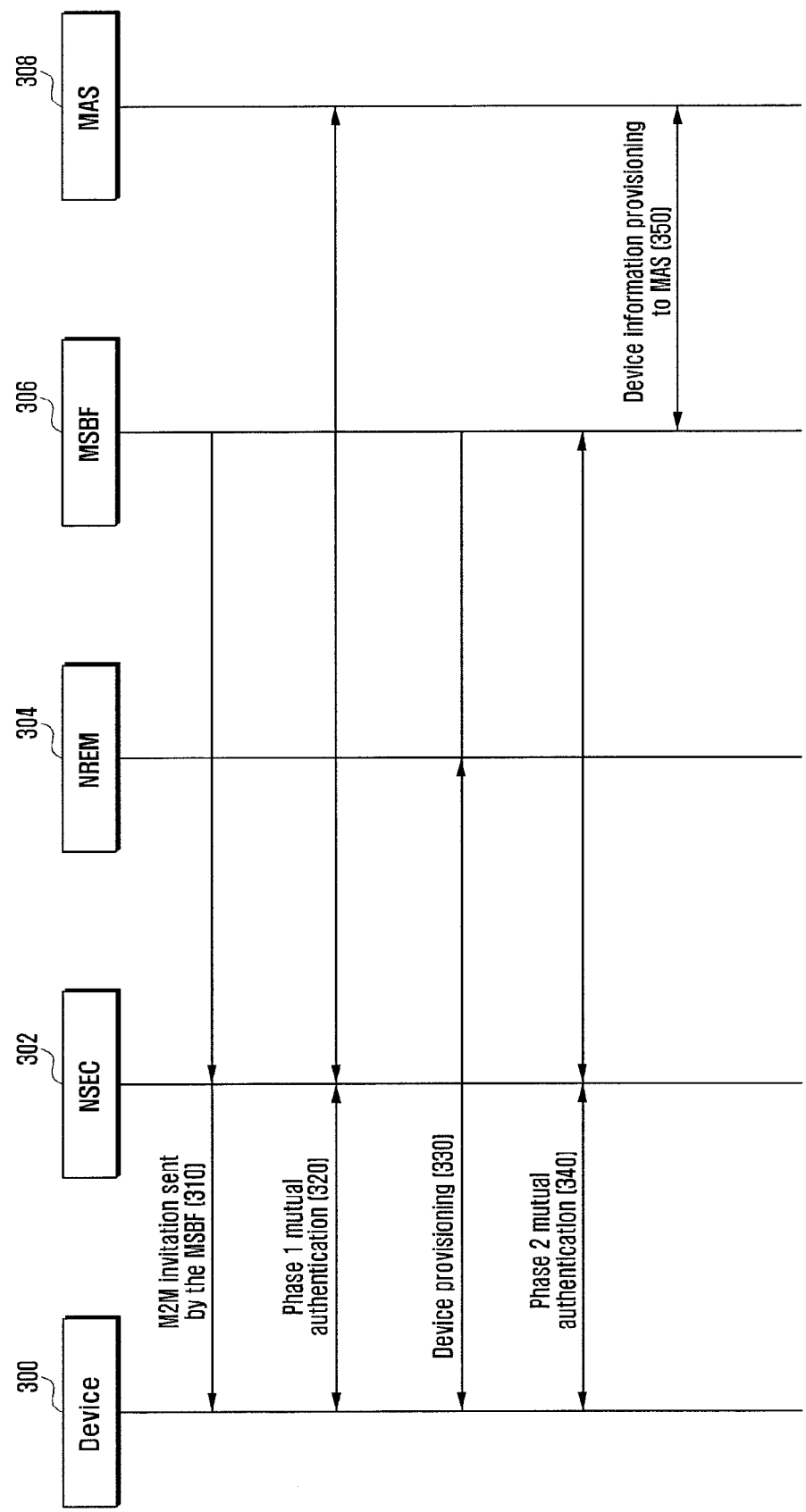

METHOD AND APPARATUS FOR PROVIDING MACHINE-TO-MACHINE SERVICE

CROSS-REFERENCE TO RELATED APPLICATIONS

This application claims the benefit under 35 U.S.C. §119 (e) of a U.S. Provisional application filed on Apr. 15, 2011 in the U.S. Patent and Trademark Office and assigned Ser. No. 61/475,972, of a U.S. Provisional application filed on May 12, 2011 in the U.S. Patent and Trademark Office and assigned Ser. No. 61/485,275, and of a U.S. Provisional application filed on Oct. 7, 2011 in the U.S. Patent and Trademark Office and assigned Ser. No. 61/544,577, the entire disclosure of each of which is hereby incorporated by reference.

BACKGROUND OF THE INVENTION

1. Field of the Invention

The present invention relates to a method and an apparatus for a communication system. More particularly, the present invention relates to a method and apparatus for providing a Machine-to-Machine (M2M) service.

2. Description of the Related Art

M2M technology is being researched and technologies that allow M2M devices to join and communicate with M2M networks in order to enable applications running on the M2M devices to communicate with the applications running on various control nodes (i.e., servers, or other similar devices) in the Internet are being developed and defined. In order to facilitate this communication, an M2M core network is designated with a role of facilitating dynamic provisioning of devices with service parameters and registration of M2M devices for enabling the application-level access. M2M Automated Bootstrap is a procedure that runs between an M2M device and an M2M network in order to perform the dynamic provisioning of the device.

SUMMARY OF THE INVENTION

Aspects of the present invention are to address the above-mentioned problems and/or disadvantages and to provide at least the advantages described below. Accordingly, an aspect of the present invention provides a method of providing service by a Machine-to-Machine (M2M) device, the method including transmitting a request for a first authentication to a Network Security Capability (NSEC), the request for the first authentication including an identifier of the M2M device, performing an Extensible Authentication Protocol (EAP) authentication with the NSEC, and generating, if the first authentication is successful, a secret key using at least one of a Master Session Key (MSK) and the identifier of the M2M device.

In accordance with an aspect of the present invention, a Machine-to-Machine (M2M) device for providing service is provided. The M2M device includes a transmitter for transmitting a request for a first authentication to Network Security Capability (NSEC), the request for the first authentication including an identifier of the M2M device, a controller for performing an Extensible Authentication Protocol (EAP) authentication with the NSEC, and a key generator for generating, if the first authentication is successful, a secret key using at least one of a Master Session Key (MSK) and the identifier of the M2M device.

In accordance with another aspect of the present invention, a method of providing service by a Network Security Capability (NSEC) in a Machine-to-Machine (M2M) system is provided. The method includes determining whether a request for a first authentication is received from an M2M device, the request for the first authentication including an identifier of the M2M device, performing, if the request for the service is received, an Extensible Authentication Protocol (EAP) authentication with the M2M device, and generating, if the first authentication is successful, a secret key using at least one of a Master Session Key (MSK) and the identifier of the M2M device.

In accordance with another aspect of the present invention, a Network Security Capability (NSEC) for providing service in a Machine-to-Machine (M2M) system is provided. The NSEC includes a controller for determining whether a request for a first authentication is received from an M2M device, the request for the first authentication including an identifier of the M2M device, and for performing, if a request for service is received, an Extensible Authentication Protocol (EAP) authentication with the M2M device, and a key generator for generating, if a first authentication is successful, a secret key using at least one of a Master Session Key (MSK) and the identifier of the M2M device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3 depicts a call flow involving a bootstrap procedure according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
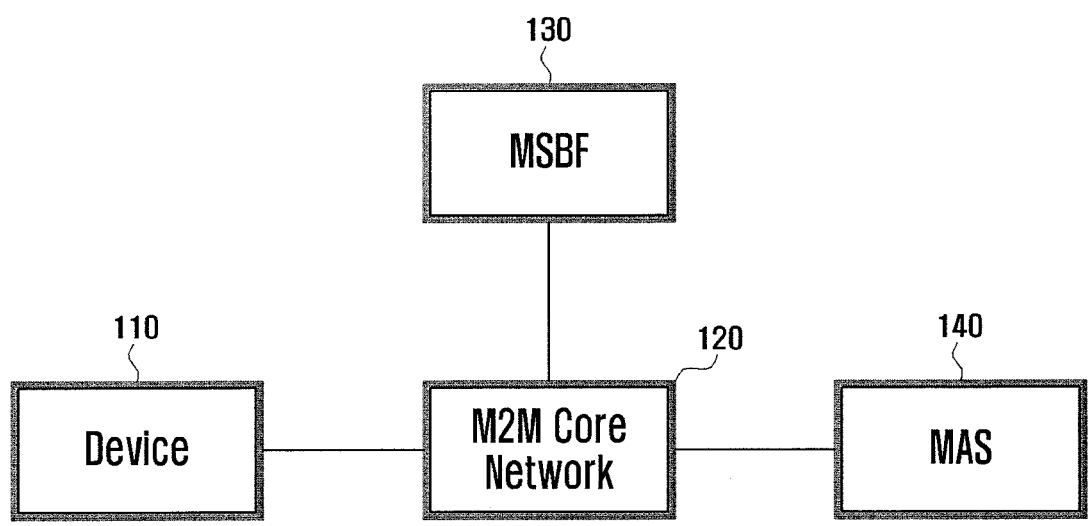
FIG. 1 depicts network elements involved in a Machine-to-Machine (M2M) Automated Bootstrap Procedure according to an embodiment of the present invention.

FIG. 1 depicts network elements involved in an M2M Automated Bootstrap Procedure according to an embodiment of the present invention.

Referring to FIG. 1, the lines connecting the network elements correspond to communication interfaces used among the network elements. Device 110 is an entity that is to be bootstrapped in order to start using M2M facilities provided by an M2M Core network 120. The device 110 engages in a bootstrap procedure with an M2M Service Bootstrapping Function (MSBF) 120 via the M2M Core network 110. At the end of the bootstrap procedure, a root secret key (KR), which will be used for cryptographically securing application communication over the M2M network is generated. The KR is stored in an M2M service layer AAA Server (MAS) 140 on the network.

The European Telecommunications Standard Institute (ETSI) M2M Technical Committee (TC) is designing M2M standards, and has identified the need for an Automated M2M Bootstrap Procedure and has identified the requirements for such.

Figure 2:
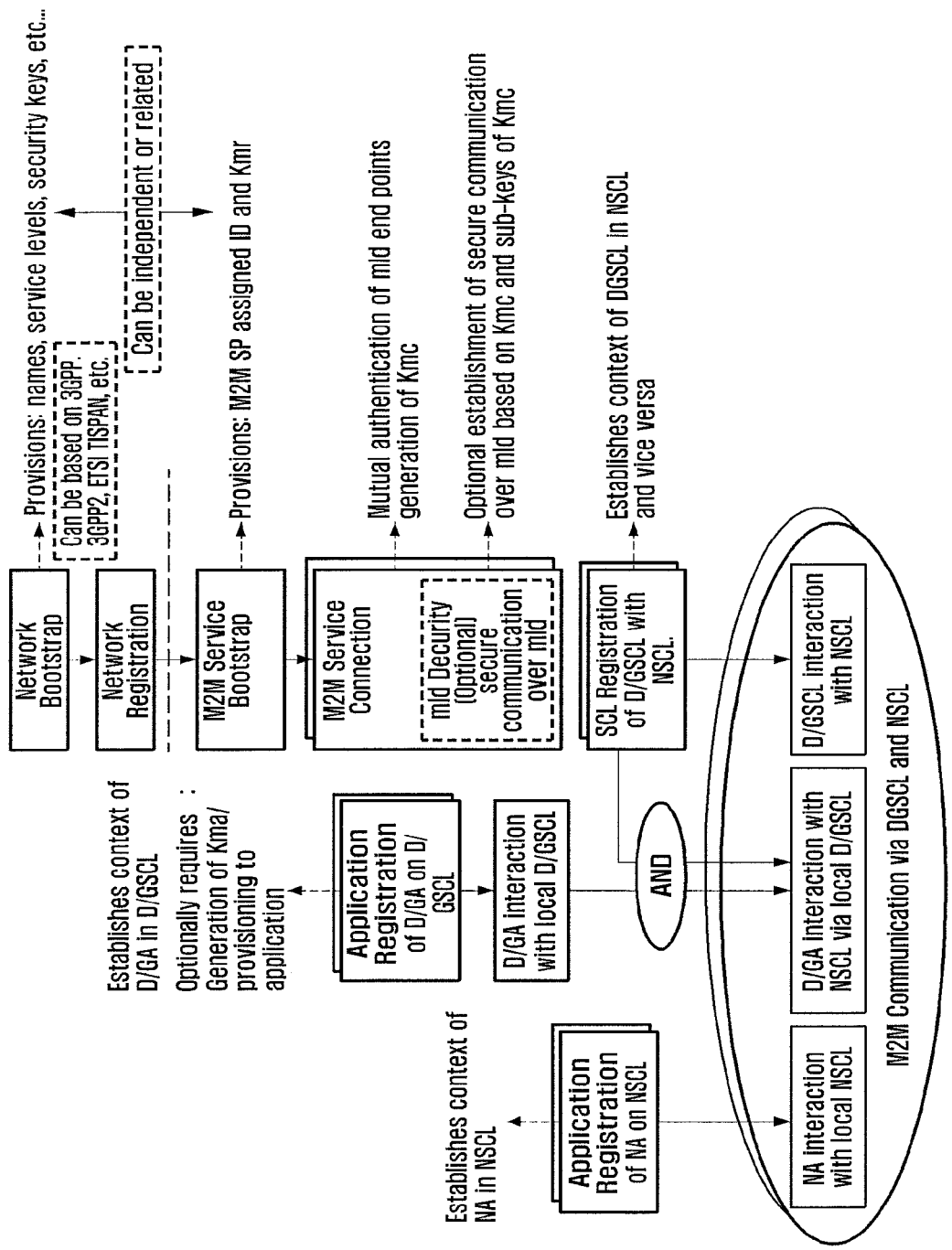
FIG. 2 depicts high-level flowchart of events occurring on M2M networks according to an embodiment of the present invention.

FIG. 2 depicts a high-level flowchart of events occurring on M2M networks according an embodiment of the present invention.

Referring to FIG. 2, Network Registration, which includes network access authentication, is a procedure used by a device for gaining access to an Internet Protocol (IP) network. Higher-layer procedures, such as M2M-related ones, may be used after successful execution of the Network Registration. M2M procedures, such as M2M Service Bootstrap and M2M Service Connection, are used for gaining access to the M2M network and to an overlay network on top of the IP network. In FIG. 2, an M2M device contains a Device Service Capability Layer (DSCL), an M2M gateway contains a Gateway Service Capability Layer (GSCL), and an Network Domain contains a Network Service Capability Layer (NSCL). The NSCL refers to M2M Service Capabilities in the Network Domain. The GSCL refers to M2M Service Capabilities in the M2M Gateway. The DSCL refers to M2M Service Capabilities in the M2M Device. The DSCL has an DSCL identifier (ID) that identifies the DSCL, and the GSCL has an GSCL identifier (ID) that identifies the GSCL.

ETSI M2M architecture supports connection of both device and gateway type equipment to the Core Network. For simplicity, only the word "Device" is used throughout the document to refer to electronic devices and gateway type equipment, and according, features, elements, and operations recited with respect to the M2M Devices also apply to M2M Gateways and gateway type equipment. The word "device" can be used herein to refer to the DSCL and/or the GSCL.

The present exemplary embodiment provides an Automated M2M Service Layer Bootstrap Procedure using Protocol for Carrying Authentication for Network Access (PANA) and Extensible Authentication Protocol (EAP). In this approach, a network registration and M2M service bootstrap are two separate procedures, as depicted in FIG. 2. PANA is a protocol used to carry EAP data between a device and a core network. However, the present invention is not limited thereto, and other suitable protocols may be substituted for PANA as long as the substitute protocols may carry EAP and the required payloads, and the operations presented herein with respect to the exemplary embodiments are followed by the substitute protocol.

In the present exemplary embodiments of the present invention, EAP authentication based on Identity-Based Authenticated Key Exchange (IBAKE) is used as the EAP authentication method being executed. However, all aspects of the present invention are not specific to the EAP authentication method being used. In other words, the present invention is not limited to EAP-IBAKE and any EAP authentication method, such as EAP-TLS, EAP-AKA, EAP-TTLS, EAP-GPSK, or other similar protocols, may be used.

Transport Layer Security (TLS) has been proposed for mutually authenticating a device and a network to each other, and for delivering the bootstrap parameters as payloads to the Hypertext Transfer Protocol Secure (HTTPS) layer. However, use of TLS introduces several problems, for which EAP and PANA provide solutions via several key features, including code reuse, extensibility, being lightweight, and providing an improved model fit. For example, with respect to code reuse, EAP is widely used for "network access authentication", such as with Wireless Fidelity (WiFi) networks, Wireless Interoperability for Microwave Access (WiMAX) networks, Zigbee networks, and Ethernet networks. PANA is used for "network access authentication" in Zigbee devices. Accordingly, reusing similar or the same components for another purpose reduces a cost of development and production of the M2M devices. With respect to extensibility, both EAP and PANA are extensible protocols and allow any authentication method to be used, unlike TLS which only allows Pre-Shared Key (PSK) and certificated-based authentication. PANA is extensible such that new payloads may be easily carried by defining new Attribute-Value-Pairs (AVPs). With respect to being lightweight, use of EAP and PANA supports both User Datagram Protocol (UDP) based stacks and also Transport Control Protocol (TCP) based stacks. On the other hand, TLS requires a TCP based stack, and thus, it requires increased code and processing as compared to using EAP and PANA. With respect to being a better model fit, EAP and PANA's 3-party authentication model correspond to M2M device-core-M2M Service Bootstrapping Function (MSBF) system architectures. In contrast, TLS is based on a 2-party design and solutions based on TLS do not naturally fit into the M2M system architectures.

FIG. 3 depicts a call flow involving a bootstrap procedure according to an exemplary embodiment of the present invention.

Referring to FIG. 3, Network Security Capability (NSEC) 302 and Network Remote Entity Management Capability (NREM) 304 reside in the M2M core network. The NSEC 302 is an authenticator and the NREM 304 is a configuration server for a device 300. Although not required in all embodiments of the present invention, in step 310, an M2M invitation is sent by an M2M Service Bootstrapping Function (MSBF) 306. In a case where the bootstrap procedure is initiated by a device 300, step 310 may be skipped because step 310 allows the network to initiate the bootstrap procedure. Accordingly, step 310 may be initiated by either the NSEC 302 or the MSBF 306. In a case where step 310 is initiated by the NSEC 302, there is no corresponding message between the MSBF 306 and the NSEC 302. However, because either the MSBF 306 or the NSEC 302 should know a network location of the device 300, in such a case a message involved in step 310 is unicast at an Internet Protocol (IP) layer and/or a link-layer. Alternatively, in a case where the MSBF 306 or the NSEC 302 does not know the exact location of the device 300, then the message is either anycasted, multicasted, or broadcasted at the IP layer and/or link-layer.

An Authentication, Authorization, and Accounting (AAA) protocol is used between the NSEC 302 and the MSBF 306. Two examples of AAA protocols are Remote Authentication Dial In User Service (RADIUS) and Diameter Base Protocol (Diameter). According to the present exemplary embodiment, the AAA protocol used between the NSEC 302 and the device 300 is PANA. The PANA message used in step 310 is a PANA-Authentication-Request (PAR) message, and, in addition to standard AVPs as defined in the PANA standard, may include the following AVPs in the PAR message: an MSBF-IDentifier (ID) is used for delivering an identifier for the MSBF 306 to the device 300; a value field of the AVP includes data elements such as an ID-Type to indicate a type of identifier, such as a Fully Qualified Domain Name (FQDN), a Network Access Identifier (NAI), a Uniform Resource Identifier, and other similar identifiers, an ID-value of the identifier, and an NSEC-ID that is used for delivering the NSEC identifier to the device 300. Additionally, a value field of the AVP includes the following data elements: an ID-Type to indicate a type of identifier, such as an FQDN, a NAI, and a URI; and an ID-value that is value of the identifier.

Since the NSEC 302 is acting as a PANA Authentication Agent (PAA) with respect to the PANA protocol, NSEC-ID and PAA identifiers are equivalent to each other. Furthermore, a Network-ID is used for delivering the identifiers of the M2M network(s) that are served by the MSBF 306 to the device 300. Zero, one, or more such AVPs may be included in the same message, and a single MSBF 306 may be serving multiple networks. Furthermore, among other data elements, a value field of the AVP may include and ID-Type and an ID-value, which are described above.

Additionally, the same AVP, as described above, may also be used by a regular PAA, i.e., a PAA that is not in an M2M network, to advertise the respective networks that the PAA is serving. Accordingly, a Network-ID may be used for representing both a service provider and also a network owned by a service provider. Also, a Device-ID may be used for delivering the identifier of a target device to receiving devices. Since the message including the AVPs may be anycasted, multicasted, or broadcasted, and thus received by multiple nodes in addition to being received by the target device, the Device-ID enables the receiving devices or nodes to determine whether a request is intended for the respective receiving devices or for some other device. The device 300 will consume an incoming message only if one or more of the Device-IDs match the identifier of the device 300, otherwise the device 300 will discard the message. Among other data elements, a Value field of the AVP includes the following data elements: an ID-Type that indicates the type of identifier, such as FQDN, NAI, URI, and MAC address; and an ID-value which is a value of the identifier. The AVPs discussed above present the ID type along with the ID value. In a case where an architecture of a network using the AVPs does not need the flexibility to support multiple different types of IDs, then a variant of these AVPs, where the ID-Type is omitted, may be used.

Additionally, a Usage-type AVP for indicating a purpose of PANA execution, i.e., whether the PANA execution is for M2M bootstrapping, for network access (i.e., the PANA execution is a legacy use of PANA), or other types of PANA execution, is defined. The Usage-type AVP may be included in a first, any, or all PANA message exchanges. The Usage-type AVP includes the following data element in a value field: a Type carries an enumerated value to indicating a usage type, for example, 0 for network access, 1 for M2M bootstrapping, 2 for M2M service registration, or other values for other types of usage.

Next, in step 320 a Phase 1 mutual authentication is executed in order to mutually authenticate the device 300 and the network to each other. According to exemplary embodiments of the present invention, the Phase 1 mutual authentication may be only one phase of authentication (e.g., with EAP-TLS) or may be two or more phases. For example, EAP-IBAKE has two phases: a first phase using a temporary ID and a password, followed by a second phase (see step 340) using Identity-Based Encryption (IBE). In a case where two phases are used, each phase executes a complete authentication method. For example, with the IBAKE approach, the first phase executes one method, such as EAP-Generalized PSK (GPSK), and the second phase executes another EAP method, such as EAP-IBAKE. In a case where one phase is used, the phase is executed according to step 340. In other words, step 320 is skipped if one phase is used.

A complete EAP authentication method is executed at step 320. That EAP authentication method is communicated via EAP over PANA between the device 300 and the NSEC 302, and is communicated via EAP over an AAA protocol between the NSEC 302 and an M2M service layer AAA Server (MAS) 308. Accordingly, a complete PANA session is established in this phase. However, if authentication fails, step 320 is halted. If authentication in step 320 is successful, actions are taken in order to enable step 320. Accordingly, step 320 accomplishes mutual authentication between the device 300 and the network, and also enables discovery, identification, and security in preparation for step 330.

In order to enable step 330, the very last PANA message that carries the authentication result carries additional AVPs. The additional AVPs include a DM-server-ID that is used for delivering an identifier of a device management server to the device 300, wherein zero, one, or more such AVPs may be included in the same message. A value field of the DM-server-ID AVP may include the following two data elements: an ID-Type that indicates the type of identifier, such as FQDN, IPv4 address, URI, or other similar identifier; and an ID-value that is the value of the identifier.

Another additional AVP is an Assigned-Device-ID that is used for delivering a device identifier assigned to the device 300 by the network, and which will be the identifier of the device 300 for subsequent signaling between the device 300 and the M2M core network, wherein zero, one, or more such AVPs may be included in the same message. A value field of the Assigned-Device-ID AVP may include the following data elements: an ID-Type that indicates a type of identifier, such as FQDN, NAI, URI, and MAC address; and an ID-value that is a value of the identifier (e.g., "light-switch-1001").

The DM-server-ID and the Assigned-Device-ID AVPs present the ID type along with the ID value. In a case where a network architecture does not support multiple different types of IDs (e.g., only one type is used), a variant of these AVPs where ID-Type is omitted may be used.

Furthermore, a cryptographic security association between the device 300 and the device management server is also established in this phase of step 320. While the Assigned-Device-ID and DM-server-ID serve as end-point identifiers, the shared secret key (KD-DM) between the two is computed based on a Master Session Key (MSK) according to the following shared secret key formula:

KD-DM=Hash(MSK, constant_string|DM-server-ID|Assigned-Device-ID|other_parameters), wherein, Hash is a one-way keyed hash function, such as Hash-based Message Authentication Code (HMAC)-Secure Hash Algorithm (SHA) 1, HMAC-SHA256, or other similar hash functions; MSK is the Master Session Key exported by the executed EAP method; constant_string is a constant string value, such as "M2M shared secret between Device and Device Management Server", and this string may contain one or more NULL characters ("\0"); DM-server-ID is a value of the device management server identifier; Assigned-Device-ID is the value of device identifier assigned by the network, wherein if no ID is assigned by the network, the device can use its own identifier as the assigned ID; and other_parameters are the zero or more parameters that may be added to a variation of this formula.

According to another exemplary embodiment of the present invention, the shared secret key formula using an Extended MSK (EMSK) instead of an MSK is as follows:

KD-DM=Hash(EMSK, constant_string|DM-server-ID|Assigned-Device-ID|other_parameters).

As a key index, a combination of a PANA Session Identifier and a PANA Key-ID are used for a given device. If the given device has only one PANA Session, then use of Key-ID alone is sufficient to index a KD-DM key.

According to another exemplary embodiment of the present invention, the shared secret key formula may use a root secret key (KR). However, this shared secret key formula is applied to a case where the KR is generated prior to the execution a device provisioning. This shared secret key formula is: KD-DM=Hash(KR, constant_string|DM-server-ID|Assigned-Device-ID|other_parameters).

Next, at step 330, device provisioning is executed (e.g., using Open Mobile Alliance (OMA)-Device Management (DM). However, step 330 is optional, and may be executed according to a configuration of an exemplary embodiment of the present invention that executes step 320. When step 330 is executed, it may be secured using the identifiers (such as Assigned-Device-ID and DM-Server-ID) and the shared key (KD-DM) generated during an earlier PANA procedure. In step 330, the identifier and cryptographic keys needed for securing such procedures may be computed as described in step 320.

Next, in step 340, phase 2 mutual authentication is executed and involves executing an EAP authentication method over PANA. Step 340 may be used by some of the authentication methods and may be omitted by other authentication methods. For example, with EAP-TLS only one phase of authentication is executed, whereas IBAKE-based authentication uses two phases, and the second phase involves running EAP-IBAKE.

One outcome of the bootstrapping procedure is the establishment of the KR as a shared secret key between the device 300 and the network. The KR is generated at the end of either step 320 or step 340, depending on the availability of the step and a configuration of a network architecture using this scheme. If the Assigned-Device-ID is not delivered during step 320, then it may be delivered at the end of this step 340, and is carried by the very last PANA message that carries the authentication result.

The KR may be generated by using one of the following alternative techniques. For example, the KR may be derived from the MSK produced by the EAP method at the end of the successful authentication procedure. In such a case, the MSK is produced by an EAP peer that resides on the device 300, and by the authentication server that resides on the MAS 308 or MSBF 306. The authentication server shares the MSK with the authenticator, i.e., the NSEC 302. Therefore, the MSK constitutes a dynamically-generated shared secret key at the end of successful authentication and it gets used as a seed for the KR derivation according to the following formula:

KR=Hash(MSK, constant_string|Assigned-Device-ID|Network-ID|other_parameters), wherein, Hash is a one-way keyed hash function, such as HMAC-SHA1, HMAC-SHA256; MSK is the Master Session Key exported by the executed EAP method; constant_string is a constant string value, such as "M2M shared secret root key between Device and network" and may contain one or more NULL characters ("\0"); Assigned-Device-ID is a value of a device identifier assigned by the network, wherein, if no ID is assigned by the network, the device can use its own identifier as the assigned ID; Network-ID is the value of network identifier; and other_parameters are the zero or more parameters that may be added to a variation of this formula.

As a key index, the combination of the PANA Session Identifier and the PANA Key-ID are used for a given device. If the given device has only one PANA Session, then use of Key-ID alone is sufficient to index a KR key.

Alternatively, the KR may be derived from the EMSK produced by the EAP method at the end of the successful authentication procedure. In such a case, the KR is produced by the EAP peer that resides on the device, and by the authentication server that resides on the MAS 308 or MSBF 306. Therefore, EMSK constitutes a dynamically-generated shared secret key at the end of successful authentication and is used as a seed for KR derivation according to the following formula: KR=Hash(EMSK, constant_string|Assigned-Device-ID|Network-ID|other_parameters).

As a key index, the combination of the PANA Session Identifier and the PANA Key-ID are used for a given device. If the given device has only one PANA Session, then use of Key-ID alone is sufficient to index a KR key. Alternatively, the following newly-defined formula can be used for computing the key index: Key-index=Hash(KR, constant_string|other_parameters).

Next, in step 350, device information provisioning to MAS is executed such that the M2M core network sends the device provisioning information (e.g., KR, device ID, etc.) with the MAS 308. This step is executed only if Phase 2 mutual authentication is successfully executed.

Note that, according to another exemplary embodiment of the present invention, the NSEC 302 may be eliminated from the above described exemplary embodiment. In such a case, the MSBF 306 and/or the MAS 308 and the device 30 directly interact with each other without having to send messages via the NSEC 302. In such a case, the PANA protocol may be used for the MSBF 306 and/or the MAS 308 and the device 300 communication (i.e., the protocol that runs between the MSBF 306 and/or the MAS 308 and the NSEC 302 may be eliminated as well).

With reference to FIG. 3, each of the device 300, the NSEC 302, the NREM 304, the MSBF 306, and the MAS 308, may respectively include a controller for controlling and performing operations of the respective device, a transmitter for transmitting signals from the respective device, a receiver for receiving signals at the respective device, a transceiver for transmitting and receiving signals at the respective device, and a key generator for generating keys.

Figure 4A:
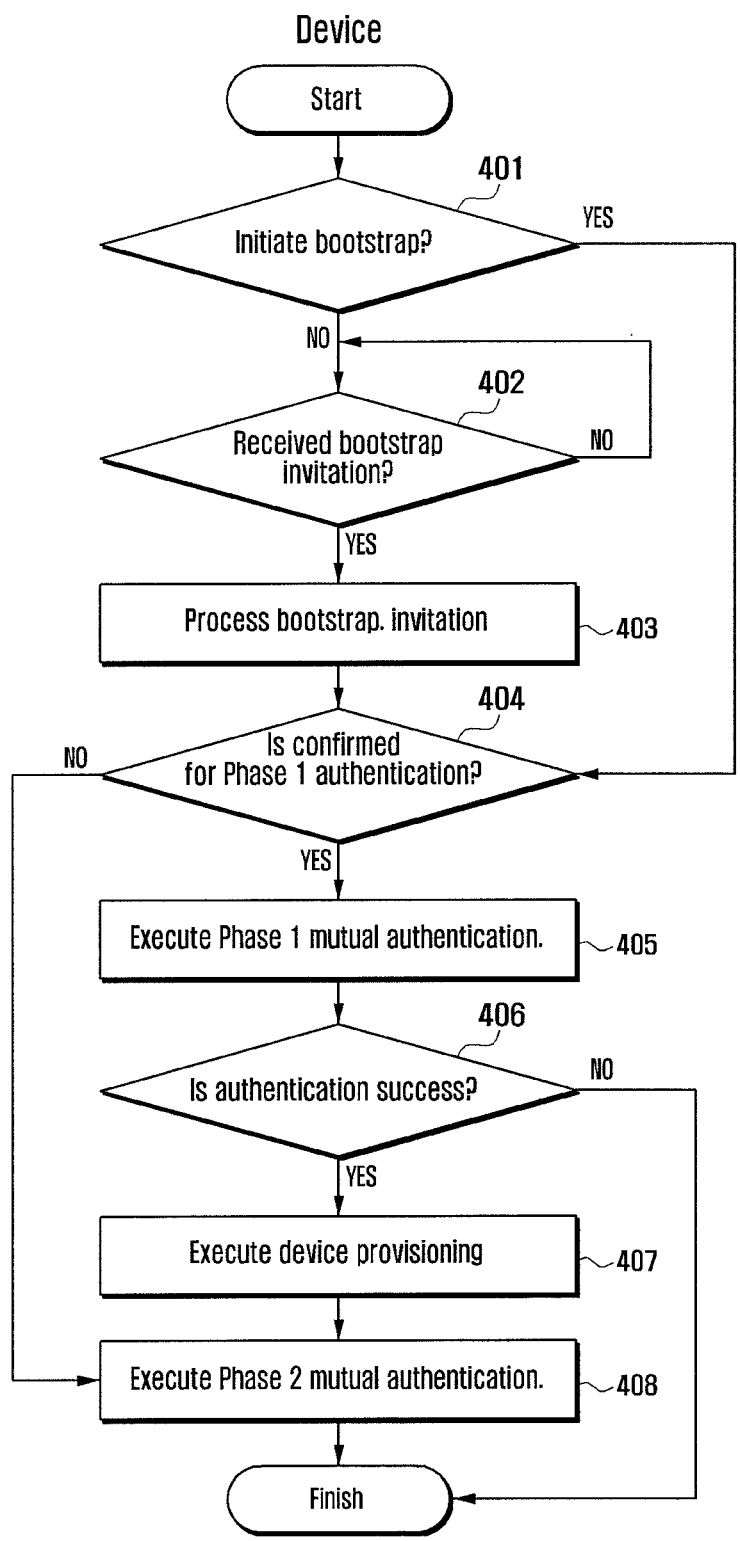
FIG. 4A depicts a flowchart for a bootstrap procedure of a device according to an exemplary embodiment of the present invention.

FIG. 4A depicts the flowchart for a bootstrap procedure of a device according to an exemplary embodiment of the present invention.

Referring to FIG. 4A, at step 401, a device determines whether the bootstrap procedure is initiated by the device. If the bootstrap procedure is initiated by the device then the process moves to step 404. Otherwise the process moves to step 402. At step 402, the device determines whether a bootstrap invitation is sent by a NSEC of an MSBF. If the bootstrap invitation is not sent, then the device waits until the bootstrap invitation is sent. Otherwise the process moves to step 403. At step 403, the device initiates the bootstrap procedure and the process moves to step 404.

At step 404, the device determines whether the Phase 1 mutual authentication is confirmed. If the authentication is not confirmed, then the process moves to step 408. Otherwise the process moves to step 405. At step 405, the device executes Phase 1 mutual authentication, and the process moves to step 406. At step 406, the device determines whether the Phase 1 mutual authentication is successful. If the Phase 1 mutual authentication is not successful, then the process terminates. Otherwise, the process moves to step 407. At step 407, the device executes device provisioning, and the process moves to step 408. At step 408, the device executes the Phase 2 mutual authentication.

Figure 4B:
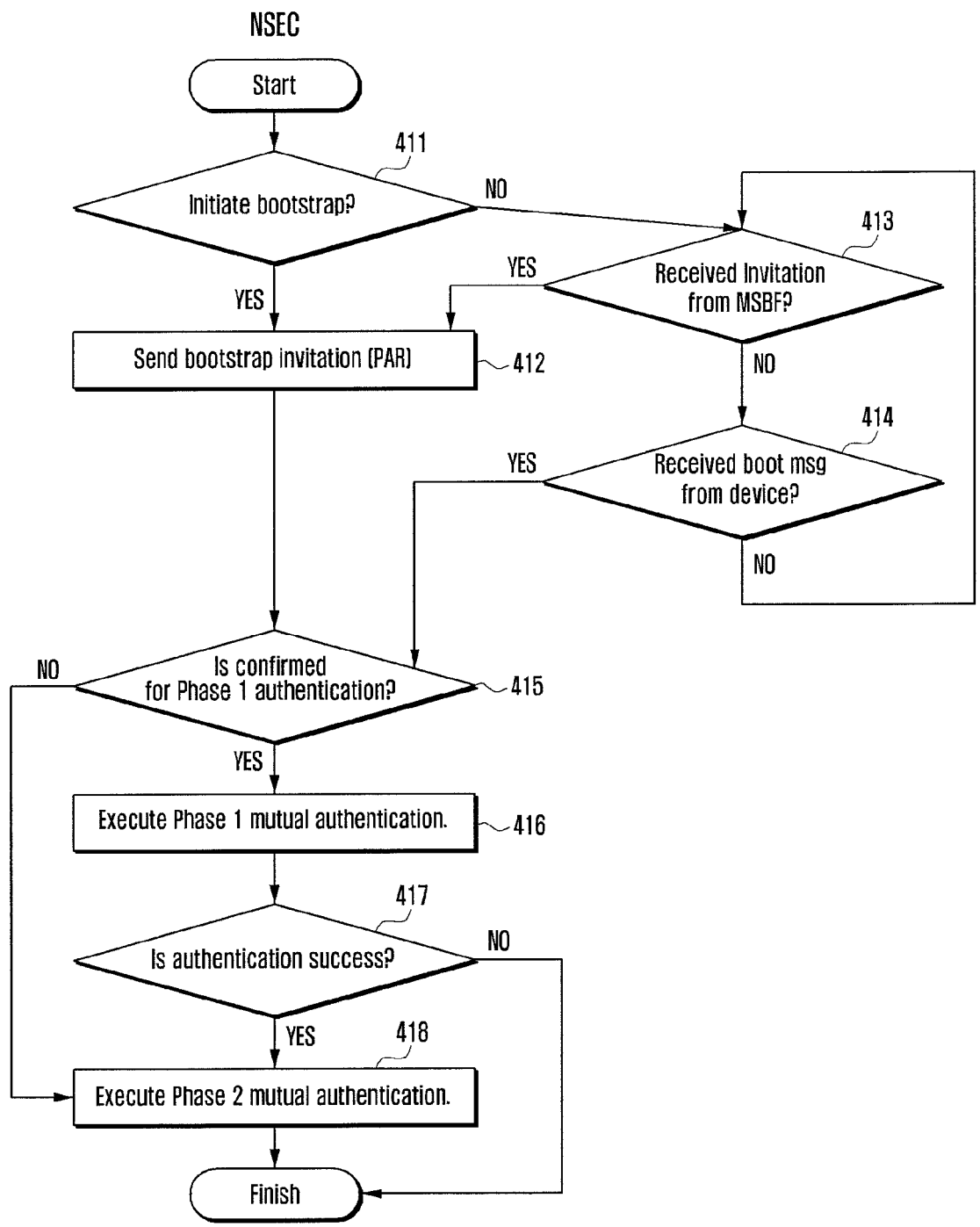
FIG. 4B depicts a flowchart for a bootstrap procedure of a Network Security Capability (NESC) according to an exemplary embodiment of the present invention.

FIG. 4B depicts the flowchart for bootstrap procedure of the NESC according to an exemplary embodiment of the present invention.

Referring to FIG. 4B, at step 411, the NSEC determines whether the bootstrap procedure is initiated by the NSEC. If the bootstrap procedure is initiated by the NSEC, then the process moves to step 412, otherwise the process moves to step 413. At step 413, the NSEC determines whether the invitation is received from MSBF. If the invitation is received from MSBF, then the process moves to step 412, otherwise the process moves to step 414. At step 414, the NSEC determines whether the boot message is received from the device. If the boot message is received from the device, then the process moves to step 415, otherwise the process moves to step 413. At step 412, the NSEC sends the bootstrap invitation to the device. The bootstrap invitation may be sent as a PANA-Authentication-Request (PAR), and the process moves to step 415.

At step 415, the NSEC determines whether the Phase 1 mutual authentication is confirmed. If the Phase 1 mutual authentication is not confirmed, then the process moves to step 418, otherwise the process moves to step 416. At step 416, the NSEC executes Phase 1 mutual authentication. At step 417, the NSEC determines whether the Phase 1 mutual authentication is successful. If the Phase 1 mutual authentication is not successful, then the process terminates, otherwise, the process moves to step 418. At step 418, the NSEC executes Phase 2 mutual authentication.

Figure 4C:
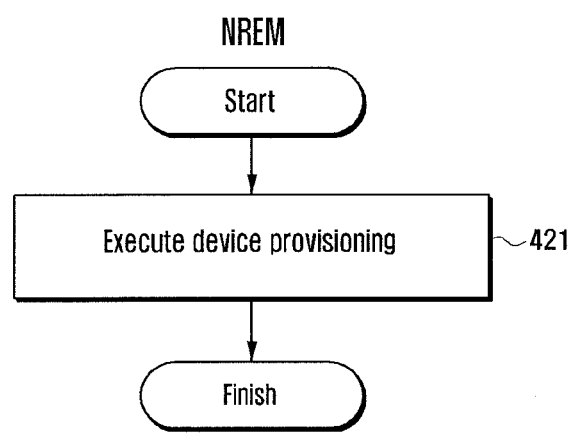
FIG. 4C depicts a flowchart for a bootstrap procedure of a Network Remote Entity Management Capability (NREM) according to an exemplary embodiment of the present invention.

FIG. 4C depicts a flowchart for a bootstrap procedure of a NREM according to an exemplary embodiment of the present invention.

Referring to FIG. 4C, at step 421, the NREM executes the device provisioning.

Figure 4D:
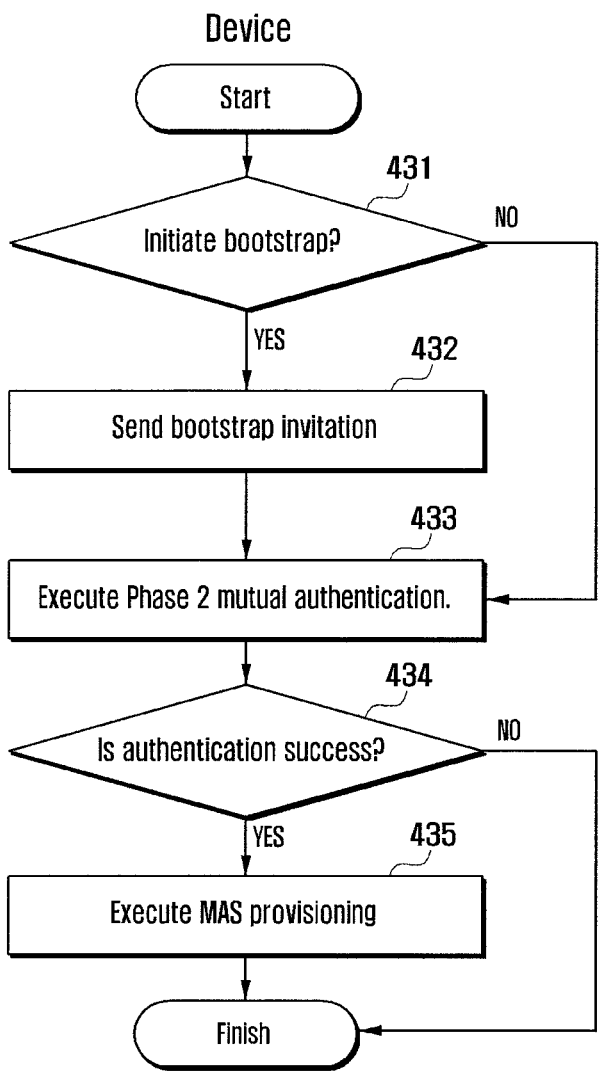
FIG. 4D depicts a flowchart for a bootstrap procedure of a M2M Service Bootstrapping Function (MSBF) according to an exemplary embodiment of the present invention.

FIG. 4D depicts a flowchart for a bootstrap procedure of an MSBF according to an exemplary embodiment of the present invention Referring to FIG. 4D, at step 431, the MSBF determines whether the bootstrap procedure is initiated by the MSBF. If the bootstrap procedure is initiated by the MSBF, then the process moves to step 432, otherwise the process moves to step 433. At step 432, the MSBF sends the bootstrap invitation to the device and the process moves to step 433. At step 433, the MSBF executes Phase 2 mutual authentication and the process moves to step 434. At step 434, the MSBF determines whether the Phase 2 mutual authentication is successful. If the Phase 2 mutual authentication is successful, then the process moves to step 435, otherwise the process terminates. At step 435, the MSBF executes MAS provisioning.

Figure 4E:
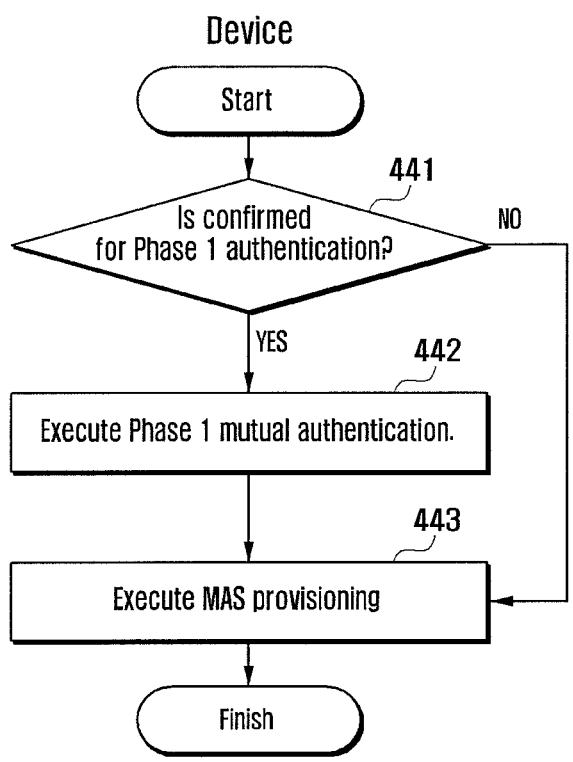
FIG. 4E depicts a flowchart for a bootstrap procedure of an M2M service layer AAA Server (MAS) according to an exemplary embodiment of the present invention.

FIG. 4E depicts a flow chart for a bootstrap procedure of an MAS according to an exemplary embodiment of the present invention.

Referring to FIG. 4E, at step 441, the MAS determines whether the Phase 1 mutual authentication is confirmed. If the Phase 1 mutual authentication is not confirmed, then the process moves to step 443, otherwise the process moves to step 442. At step 442, the MAS executes the Phase 1 mutual authentication and the process moves to step 443. At step 443, the MAS executes the MAS provisioning.

The exemplary embodiments of the present invention may be applied to M2M systems that require automated bootstrapping of the M2M devices. In networks where the devices can be pre-provisioned (e.g., provisioned during manufacturing time), such a solution is not required. However, because of the dynamic and large-scale nature of M2M deployments, it is not practical to rely on pre-provisioning.

According to another exemplary embodiment, M2M Service Layer Bootstrap using EAP-based Network Access Authentication Procedure is provided. A bootstrap procedure that solely executes bootstrapping is already described above with respect to the exemplary embodiments of FIGS. 4A to 4E. The present exemplary embodiment is an optimized procedure that utilizes the network access authentication for bootstrapping the device for the M2M Service Layer. Devices perform network access authentication in order to connect to a given network before starting to use any higher-layer services, such as the M2M service. In order to perform such an authentication, the present exemplary embodiment describes an associated procedure that takes advantage of the already-executed authentication.

Figure 5:
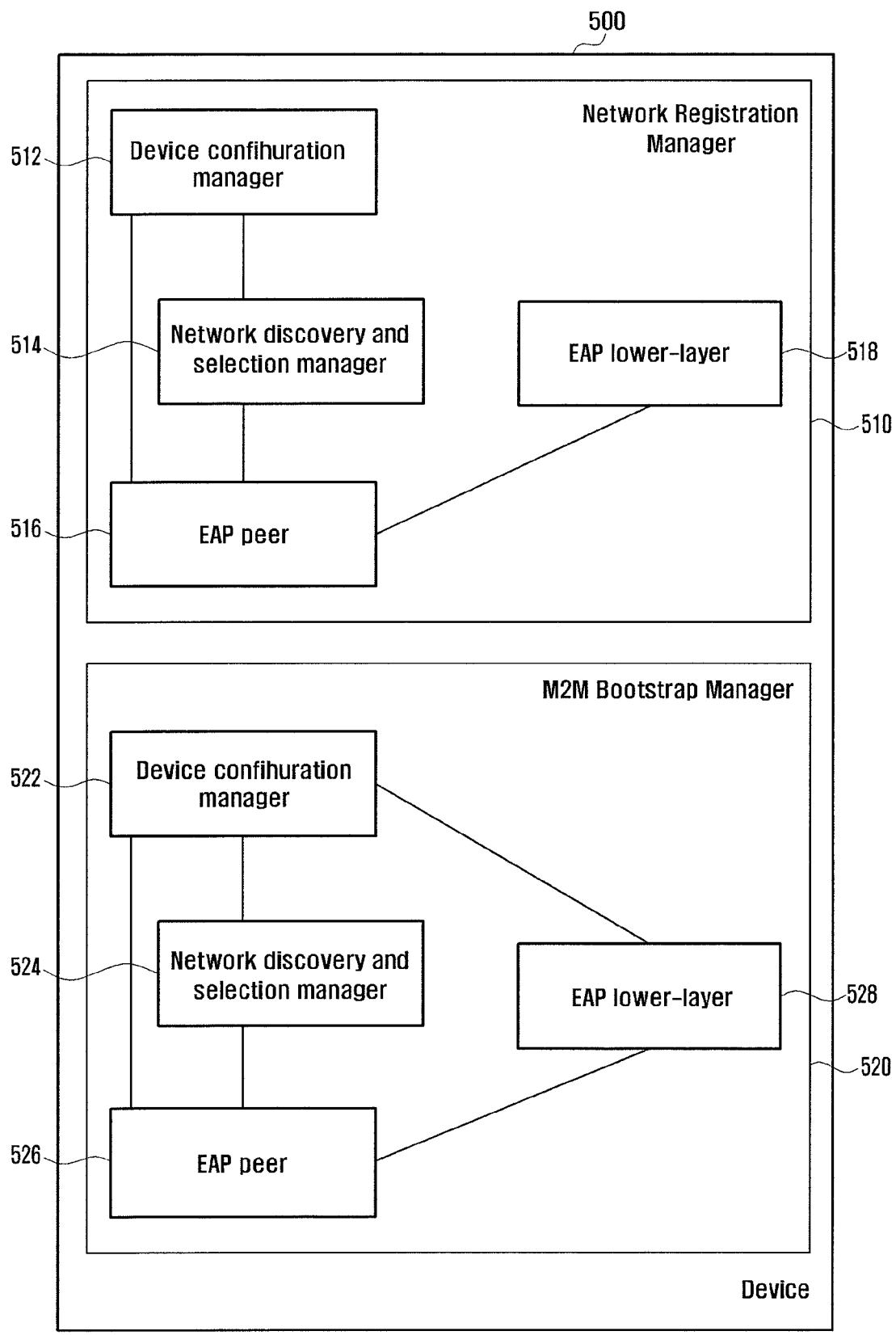
FIG. 5 depicts a device functional model according to an exemplary embodiment of the present invention.

FIG. 5 depicts a device functional model according to an exemplary embodiment of the present invention.

Referring to FIG. 5, a device 500 includes a Network Registration Manager 510 and an M2M Bootstrap Manager 520. The Network Registration Manager 510 registers the device 500 with the network for the network access service (i.e., gaining access to the IP network). The M2M Bootstrap Manager 520 manages the bootstrapped state of the device 500.

The Network Registration Manager 510 includes the below discussed elements. A Device configuration manager 512 manages configuration parameters such as the Device ID and the Network ID that are used for IP network access. This Device configuration manager 512 interfaces with the network discovery and selection manager for exporting the pre-configured Network ID and importing a dynamically learned Network ID. The Device configuration manager 512 also interfaces with the EAP peer for exporting the network user credentials to be used during EAP authentication. A Network discovery and selection manager 514 executes the network discovery and selection procedure for the IP network and interfaces with the EAP peer 516 in order to export the selected Network ID. An EAP peer 516 interfaces with the EAP lower-layer to carry out EAP authentication method. An EAP lower-layer 518 performs lower-layer services for the EAP peer 516.

The M2M Bootstrap Manager 520 includes the below discussed elements. A Device configuration manager 522 manages the configuration parameters such as the Device ID and the Network ID that are used for M2M network access. This Device configuration manager 522 interfaces with the network discovery and selection manager for exporting the preconfigured Network ID and importing the dynamically learned Network ID and interfaces with the EAP peer 526 for exporting the M2M user credentials to be used during EAP authentication. A Network discovery and selection manager 524 executes the network discovery and selection procedure for the M2M network and interfaces with the EAP peer 526 in order to export the selected Network ID. An EAP peer 526 interfaces with the EAP lower-layer to carry out EAP authentication method. An EAP lower-layer 528 interfaces with the EAP peer 526.

There are procedures defined for the M2M bootstrapping that involve running a protocol between the device and the MSBF for mutually authenticating each other and generating the required M2M root key. In most M2M networks the devices are to be authenticated before gaining access to the network. Instead of running a separate authentication for the bootstrap procedure, the present exemplary embodiments may utilize the network access authentication in order to reduce the implementation, latency, and processing load imposed by the bootstrap procedure.

Figure 6:
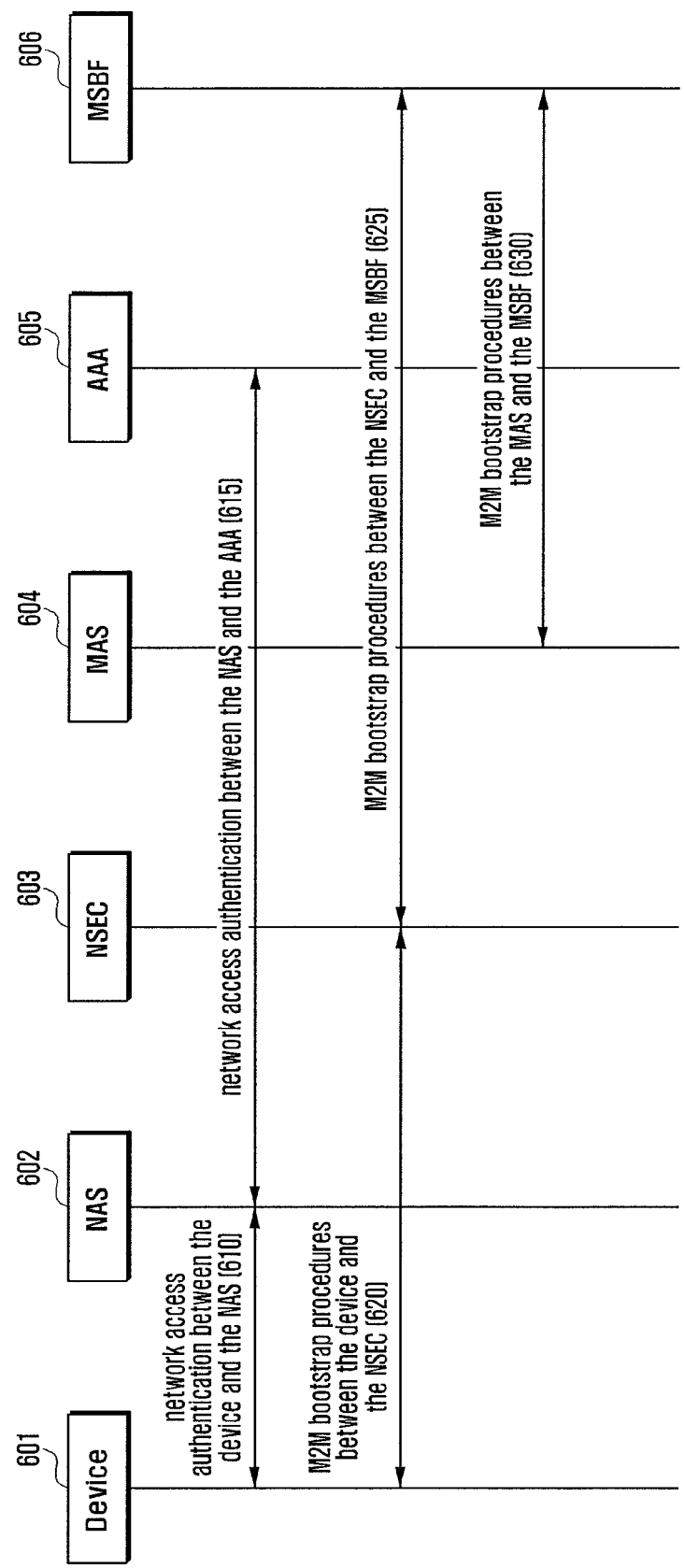
FIG. 6 depicts a separate network access authentication and the M2M bootstrap procedures according to an exemplary embodiment of the present invention.

FIG. 6 depicts a separate network access authentication and M2M bootstrap procedures according to an exemplary embodiment of the present invention.

A Network Access Server (NAS_) 602 implementing a EAP Authenticator and AAA client functionalities. An MAS 604 and a device 601 are also shown in FIG. 6. and an AAA 605 implements the Authentication, Authorization, and Accounting server and the EAP authentication server functionalities. An NSEC 603 performs security functions and an MSBF 606 provides the M2M Service Bootstrap function.

In the present exemplary embodiment of FIG. 6, the M2M bootstrapping procedure becomes part of the network access authentication procedure. The network access authentication procedure is utilized for the generation of the KR. Instead of authenticating the device 601 twice (once for network access, and once for M2M bootstrap), the device 601 is authenticated once for the network access, and the resultant keys are used for generation of the KR. In step 610, network access authentication is performed between the device 601 and the NAS 602. In step 615, network access authentication is performed between the NAS 602 and the AAA 605. In step 620, M2M bootstrap procedures are performed between the device 601 and the NSEC 603. In step 625, the M2M bootstrap procedures are performed between the NSEC 603 and the MSBF 606. In step 630, the M2M bootstrap procedures are performed between the MAS 604 and the MSBF 606.

The present exemplary embodiment of FIG. 6 is applicable to the networks using EAP-based network access authentication. In contrast, the exemplary embodiment of FIGS. 4A-4E are more applicable to the networks using EAP over PANA FIG. 7 depicts a call flow for both networks using EAP over PANA and any network using EAP according to an exemplary embodiment of the present invention.

Figure 7:
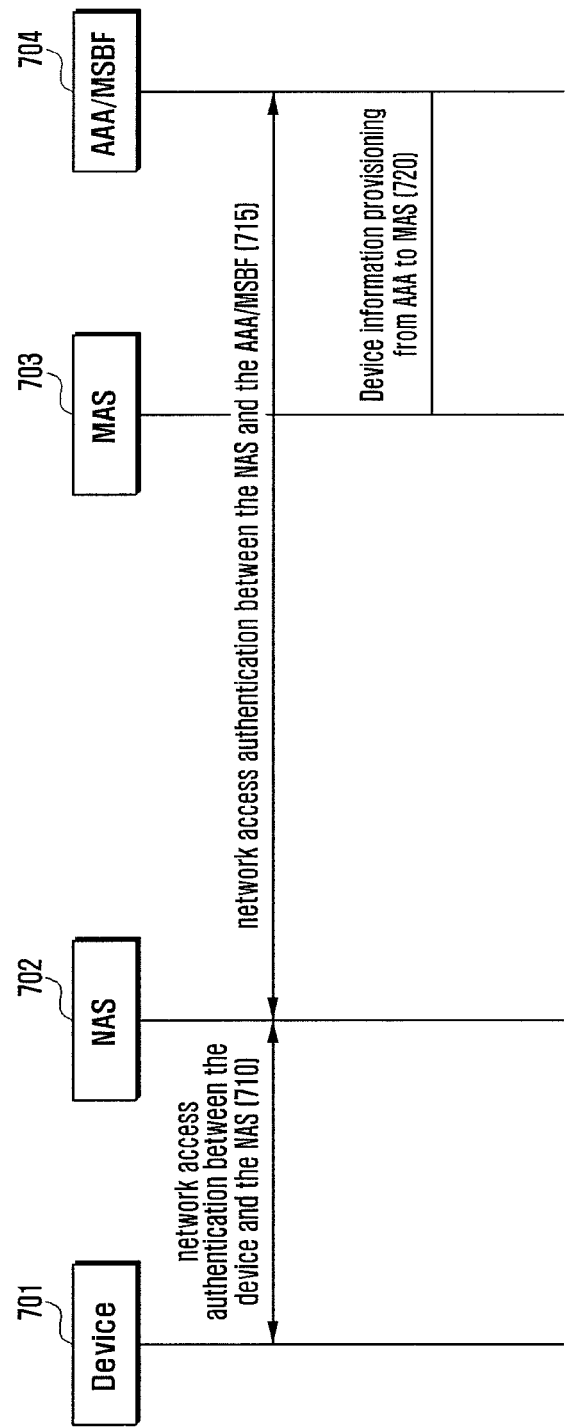
FIG. 7 depicts a call flow both networks using Extensible Authentication Protocol (EAP) over Protocol for Carrying Authentication for Network Access (PANA) and any network using EAP according to an exemplary embodiment of the present invention.

Referring to FIG. 7, the AAA is incorporated with the MSBF so as to have the AAA/MSBF 704. This approach is utilized when the access network is using EAP over PANA for network access authentication. In steps 710 and 715, a device 701 performs EAP-based network access authentication with the AAA/MSBF 704 via a NAS 702. EAP is carried over PANA between the Device 701 and the NAS 702 in step 710, and carried over RADIUS, Diameter, or an equivalent protocol between the NAS 702 and the AAA/MSBF 704 in step 715.

In addition to regular PANA call flows and payloads used for regular network access authentication, additional payloads are exchanged in order to perform M2M bootstrapping. One or more of the PANA messages should contain the Usage-Type AVP where the Type value is set to a value that indicates M2M Bootstrapping. Additionally, the very last PANA message that indicates the authentication result may include zero or more Assigned-Device-ID AVP(s) to carry the device identifiers assigned by the network. Also, one or more of the PANA messages should contain the Network-ID AVP. The additional payloads and AVPs have been described above and further description will be avoided for the purpose of brevity.

At the end of successful EAP authentication in steps 710 and 715, an EMSK is generated. This key is known to the device 701 and the AAA/MSBF 704. Furthermore, the KR may be derived from the EMSK as described with reference to the exemplary embodiments of FIG. 3.

As a key index, the combination of the PANA Session Identifier and PANA Key-ID are used for a given device. If the given device has only one PANA Session, then the use of Key-ID alone is sufficient to index a KR key. Alternatively, the key index may be computed in the manner discussed with reference to the exemplary embodiment of FIG. 3. Accordingly, the KR may be randomly generated by the network and securely delivered to the device 701 using a dedicated PANA AVP. The KR is encrypted before being transmitted to the device 701, and the device 701 decrypts the KR upon receiving the KR. For such an encryption/decryption procedure, another key is defined which can be derived on both the device and the network side. The KR is encrypted by the authentication server and decrypted by the device. The key used for this encryption/decryption procedure is based on the EMSK, and is computed according to the following formula: AS_ENCR_KEY=Hash(EMSK, constant_string|other_parameters).

As a key index, the combination of the PANA Session Identifier and the PANA Key-ID are used for a given device. If the given device has only one PANA Session, then use of Key-ID alone is sufficient to index a AS_ENCR_KEY key. Alternatively, the following newly-defined formula can be used for computing the key index: Key-index=Hash(AS_ENCR_KEY, constant_string|other_parameters).

The KR in encrypted form is sent from AAA/MSBF 704 to the NAS 702 using an AAA protocol, and is relayed from the NAS 702 to the device 701 using a PANA AVP in the very last PANA message that carries the authentication result. An M2M-KR AVP may be included in the aforementioned PANA message, wherein the M2M-KR is used for delivering the KR to the device 701. A Value field of the M2M-KR AVP includes the following data elements: a Key-ID that carries the identifier (index) of the KR, wherein the value of this identifier is assigned by the network; and a KR-Encr, which is an encrypted value of the KR. The key used for encryption is the AS_ENCR_KEY.

Next, in step 720, device information provisioning from the AAA 704 to MAS 703 is executed. Step 720 involves the AAA 704 sharing the device provisioning information (e.g., KR, device ID, etc.) with the MAS 703.

The exemplary embodiment of FIG. 7 may be applied to deployments where neither PANA nor a similarly extensible EAP transport is used for carrying EAP. In such cases, dedicated payloads, such as a Network-ID and an Assigned-Device-ID, are not conveyed to a device. Thus, it is assumed that these parameters are determined in a manner not relevant to the present exemplary embodiment. However, the device may already be configured with a Device ID, and the device discovers the Network ID with the help of the network discovery facilities presented by the link-layers. The following formula is used for deriving KR from EMSK: KR=Hash(EMSK, constant_string|Assigned-Device-ID|Network-ID|other_parameters).

A Key index for KR is computed according to the following newly-defined formula: Key-index=Hash(KR, constant_string|other_parameters).

Figure 8:
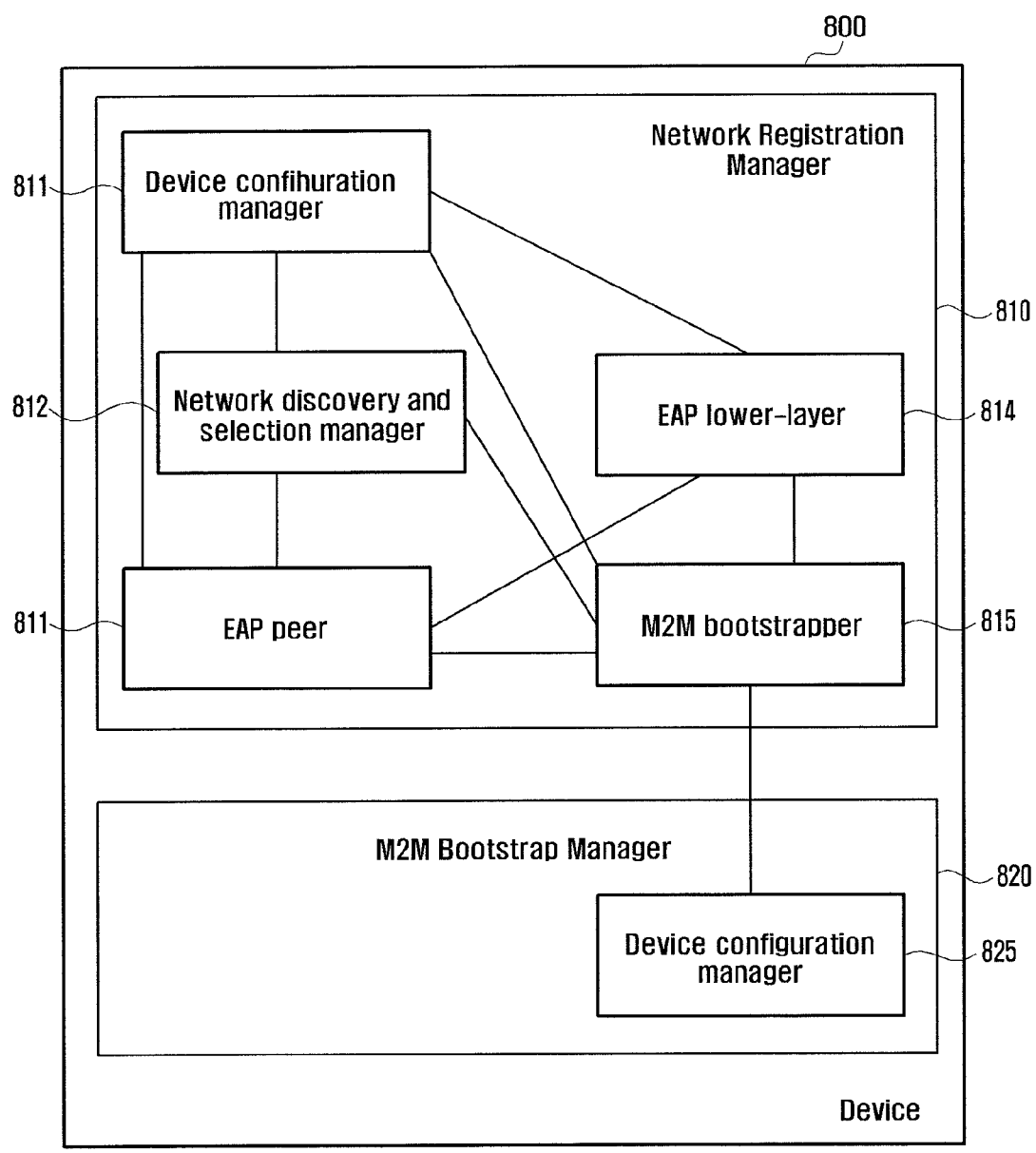
FIG. 8 depicts a device functional model according to an exemplary embodiment of the present invention.

FIG. 8 depicts a device functional model according to an exemplary embodiment of the present invention.

Referring to FIG. 8, a device 800 includes a Network Registration Manager 810 and an M2M Bootstrap Manager 820. The Network Registration Manager 810 registers the device 800 with the network for network access services (i.e., gaining access to the IP network). The M2M Bootstrap Manager 820 manages the bootstrapped state of the device.

The Network Registration Manager 810 includes the below discussed elements. A Device configuration manager 811 manages configuration parameters, such as the Device ID and the Network ID, that are used for IP network access. The Device configuration manager 811 interfaces with a Network discovery and selection manager 812 for exporting the pre-configured Network ID and importing the dynamically learned Network ID and interfaces with an EAP peer 811 for exporting the network user credentials to be used during EAP authentication. Also, the Device configuration manager 811 interfaces with an EAP lower-layer 814 to import the dynamically learned Device ID, and interfaces with the M2M bootstrap manager 820 for exporting the pre-configured Device ID.

The Network discovery and selection manager 812 executes the network discovery and selection procedure for the IP network and interfaces with the EAP peer 813 in order to export the selected Network ID. The Network discovery and selection manager 812 also interfaces with the M2M bootstrapper 815 in order to export the selected Network ID. The EAP peer 813 interfaces with the EAP lower-layer 814 to carry out EAP authentication method and also interfaces with an M2M bootstrapper 815 in order to export the EMSK.

The EAP lower-layer 814 interfaces with the M2M bootstrapper 815 in order to export the dynamically learned Network ID and Assigned Device ID. The M2M bootstrapper 815 receives the input parameters from the other entities within the network registration manager 810 and produces the KR and Key Index according to the formulas of the exemplary embodiments. The M2M bootstrapper 815 also interfaces with the M2M Bootstrap Manager 820, i.e., the device configuration manager in the M2M Bootstrap Manager 820, for exporting these information elements.

There M2M Bootstrap Manager 820 includes a Device configuration manager 825 for managing configuration parameters such as the Device ID, the Network ID, and KR, that are used for M2M network access and imports these parameters from the M2M bootstrapper 815 that resides in the Network Registration Manager 810.

The present exemplary embodiments may be applied to M2M systems that execute bootstrapping of the M2M devices. In networks where the devices may be pre-provisioned (e.g., during manufacturing time) such a solution may be skipped. In networks having dynamic and large-scale M2M deployments, relying on pre-provisioning becomes a problem due to the large-scale of the M2M deployments. Accordingly, the exemplary embodiments are applicable to the networks using EAP-based network access authentication. According the present exemplary embodiments, an access network provider and the M2M network provider are the same entity or are in a business relationship, so that they can share keying material as required in step 320 of the exemplary embodiment of FIG. 3.

While the invention has been shown and described with reference to certain exemplary embodiments thereof, it will be clearly understood by those skilled in the art that various changes in form and details may be made therein without departing from the spirit and scope of the present invention as defined by the appended claims and their equivalents.

What is claimed is:

1. A method for machine-to-machine (M2M) service bootstrapping of an M2M device, the method comprising:
    receiving, at the M2M device, a first message from a network M2M node, the first message comprising a service provider (SP) identifier (ID) and at least one of a usage type, an M2M service bootstrap function (MSBF) ID, a network service capability layer (NSCL) ID, and a target device ID;
    receiving, at the M2M device, a second message from the network M2M node after receiving the first message from the network M2M node;
    identifying whether the second message includes a service provider assigned device ID; and
    generating, by the M2M device, an M2M root key based on the SP ID and the service provider assigned device ID if the second message from the network M2M node includes the service provider assigned device ID based on a result of the identification,
    wherein the M2M root key is used for mutual authentication between the M2M device and a service provider corresponding to the SP ID, and
    wherein the generating of the M2M root key comprises generating, if the service provider assigned device ID is not assigned by the network, the M2M root key based on an extended master session key (EMSK), a predetermined string, the SP ID, and the M2M device's own ID.

2. The method of claim 1, wherein the generating of the M2M root key further comprises:
    generating the M2M root key based on the extended master session key (EMSK), the predetermined string, the SP ID, and the service provider assigned device ID.

3. The method of claim 1, further comprising:
    discarding, if the target device ID does not match the M2M device's own ID, the first message.

4. The method of claim 1, wherein at least one of the M2M root key and the service provider assigned device ID is transmitted to an M2M authentication server (MAS).

5. A method for machine-to-machine (M2M) service bootstrapping of an M2M network node server, the method comprising:
- transmitting, by the M2M network node server, a first message to an M2M device, the first message comprising a service provider (SP) identifier (ID) and at least one of a usage type, an M2M service bootstrap function (MSBF) ID, a network service capability layer (NSCL) ID, and a target device ID;
- identifying, by the M2M network node server, whether the M2M device is assigned a service provider assigned device ID;
- transmitting, by the M2M network node server, a second message to the M2M device after transmitting the first message to the M2M device; and
- generating, by the M2M network node server, an M2M root key based on the SP ID and the service provider assigned device ID if the second message from the network M2M node includes the service provider assigned device ID based on a result of the identification,
- wherein the M2M root key is used for mutual authentication between the M2M device and a service provider corresponding to the SP ID, and
- wherein the generating of the M2M root key comprises generating, if the service provider assigned device ID is not assigned by the network, the M2M root key based on an extended master session key (EMSK), a predetermined string, the SP ID, and the M2M device's own ID.

6. The method of claim 5, wherein the generating of the M2M root key further comprises:
- generating the M2M root key based on the extended master session key (EMSK), the predetermined string, the SP ID, and the service provider assigned device ID.

7. The method of claim 5, wherein the first message is discarded by the M2M device if the target device ID does not match the M2M device's own ID.

8. The method of claim 5, further comprising:
- transmitting at least one of the M2M root key and the service provider assigned device ID to an M2M authentication server (MAS).

9. An apparatus of machine-to-machine (M2M) device for M2M service bootstrapping, the apparatus comprising:
- a transceiver configured to communicate with a network M2M node; and
- a controller configured to:
  - receive a first message from the network M2M node, the first message comprising a service provider (SP) identifier (ID) and at least one of a usage type, an M2M service bootstrap function (MSBF) ID, a network service capability layer (NSCL) ID, and a target device ID;
  - receive a second message from the network M2M node after receiving the first message from the network M2M node;
  - identify whether the second message includes a service provider assigned device ID; and
  - generate an M2M root key based on the SP ID and the service provider assigned device ID if the second message from the network M2M node includes the service provider assigned device ID based on a result of the identification,
- wherein the M2M root key is used for mutual authentication between an M2M device and a service provider corresponding to the SP ID, and
- wherein the controller is further configured to generate, if the service provider assigned device ID is not assigned by the network, the M2M root key based on an extended master session key (EMSK), a predetermined string, the SP ID, and the M2M device's own ID.

10. The apparatus of claim 9, wherein the controller is further configured to generate the M2M root key based on the extended master session key (EMSK), the predetermined string, the SP ID, and the service provider assigned device ID.

11. The apparatus of claim 9, wherein the controller is further configured to discard, if the target device ID does not match the M2M device's own ID, the first message.

12. The apparatus of claim 9, wherein at least one of the M2M root key and the service provider assigned device ID is transmitted to an M2M authentication server (MAS).

13. An apparatus of a machine-to-machine (M2M) network node server for M2M service bootstrapping, the apparatus comprising:
- a transceiver configured to communicate with at least one of an M2M device and M2M authentication server (MAS); and
- a controller configured to:
  - transmit a first message to the M2M device, the first message comprising a service provider (SP) identifier (ID) and at least one of a usage type, an M2M service bootstrap function (MSBF) ID, a network service capability layer (NSCL) ID, and a target device ID;
  - identify whether the M2M device is assigned a service provider assigned device ID;
  - transmit a second message to the M2M device after transmitting the first message to the M2M device; and
  - generate an M2M root key based on the SP ID and the service provider assigned device ID if the second message from the network M2M node includes the service provider assigned device ID based on a result of the identification,
- wherein the M2M root key is used for mutual authentication between the M2M device and a service provider corresponding to the SP ID, and
- wherein the controller is further configured to generate, if the service provider assigned device ID is not assigned by the network, the M2M root key based on an extended master session key (EMSK), a predetermined string, the SP ID, and the M2M device's own ID.

14. The apparatus of claim 13, wherein the controller is further configured to generate the M2M root key based on the extended master session key (EMSK), the predetermined string, the SP ID, and the service provider assigned device ID.

15. The apparatus of claim 13, wherein the first message is discarded by the M2M device if the target device ID does not match the M2M device's own ID.

16. The apparatus of claim 13, wherein the controller is further configured to transmit at least one of the M2M root key and the service provider assigned device ID to the MAS.

* * * * *